United States Patent [19]

Vitek

[11] 3,961,024

[45] June 1, 1976

[54] FLUORO COMPOUND PRODUCTION

[75] Inventor: Richard K. Vitek, Florham Park, N.J.

[73] Assignee: Allied Chemical Corporation, New York, N.Y.

[22] Filed: June 18, 1963

[21] Appl. No.: 289,778

[52] U.S. Cl. ................... 423/406; 260/583 NH; 423/489
[51] Int. Cl.² .................................. C01B 21/52
[58] Field of Search .............. 23/205, 356; 260/583, 260/551, 553, 583 NH; 423/406, 489

[56] References Cited
UNITED STATES PATENTS

| | | | |
|---|---|---|---|
| 3,206,284 | 9/1965 | Cleaver | 423/406 |
| 3,228,936 | 1/1966 | Davis et al. | 260/553 X |
| 3,294,495 | 12/1966 | Lawton et al. | 423/406 |

*Primary Examiner*—Leland A. Sebastian
*Attorney, Agent, or Firm*—Jay P. Friedenson; Ernest A. Polin

EXEMPLARY CLAIM

1. The process for cleaving substituted ammonia compounds containing nitrogen-hydrogen bonds selected from the group consisting of alkali metal amides, urea, biuret, sulfamide, formamide, hydrazine, ethylenediamine, cyanoguanidine and melamine and fluorinating the resulting cleavage products, which comprises in combination the steps of:
   a. introducing into a reaction zone one or more of the afore-mentioned substituted ammonia compounds as starting material and a fluoride catalyst, said fluoride catalyst being a fluoride of a metal which forms an acid salt with hydrogen fluoride,
   b. subjecting said starting material to the action of elemental fluorine while in the presence of said catalyst,
   c. maintaining temperatures in the reaction zone substantially in the range of 0°–300°C. but not above the phase change temperature of the starting material if a liquid, or not above the decomposition temperature of the starting material if a solid, and
   d. collecting from the reaction zone the volatile off-gases containing fluorinated cleavage products.

14 Claims, No Drawings

FLUORO COMPOUND PRODUCTION

This invention relates to processes for making fluoro-nitrogen compounds. More particularly, the improvements are directed to methods for producing nitrogen-fluorine compounds including perfluoro-nitrogen compounds such as nitrogen trifluoride, $NF_3$, b.p. minus 129° C.; difluorodiazine, $N_2F_2$, b.p. minus 106°–111° C.; and tetrafluorohydrazine, $N_2F_4$, b.p. minus 73° C.

The invention processes involve direct fluorination, by means of elemental fluorine, of certain compounds containing nitrogen-hydrogen bonds. It has been found that by the invention process these compounds are cleaved and the cleaved products are fluorinated. A relatively large class of compounds containing nitrogen-hydrogen bonds constitutes potential starting materials for making fluoro-nitrogen compounds such as noted above. Previous attempts to effect fluorination of compounds containing nitrogen-hydrogen bonds have been characterized by low yields, notably incomplete fluorination, and irregular and erratic reactions often including more or less explosive conditions.

In accordance with this invention, it has been found that direct fluorination reactions between starting materials containing nitrogen-hydrogen bonds and elemental fluorine may be catalyzed or promoted in such a way as to provide reactions which proceed smoothly, and which may be employed to effect fluorination to perfluoro-nitrogen compounds. The invention involves the discovery that when direct fluorination of certain compounds containing nitrogen-hydrogen bonds is carried out in the presence of certain metal fluoride catalysts or reaction promoters and under certain reaction conditions, the major objectives of the invention, i.e., smooth, easily controllable reactions cleavage and, fluorination preferably perfluorination of the cleavage products with good yields are attainable. The invention includes discovery of a class of compounds containing nitrogen-hydrogen bonds which are suitable starting materials, a class of metal fluoride compounds which function to catalyze cleavage of the starting materials and fluorination of the cleaved products, and certain hereafter described procedural reaction conditions.

In general practice, the usually solid starting material containing nitrogen-hydrogen bonds and the usually solid catalytic or reaction promoter metal fluoride are incorporated together in comminuted or granular form to provide a mixture of starting material and reasonably well dispersed metal fluoride. The mixture is then subjected to the action of elemental fluorine while maintaining certain relatively low to moderately high temperature and other reaction conditions. The off-gas from the reactor, in which the starting material-metal fluoride catalyst mixture is subjected to the action of elemental fluorine, contains the soughtfor usually perfluorinated nitrogen compounds which may be recovered by low temperature condensation followed by conventional fractional distillation.

Compounds containing nitrogen-hydrogen bonds which are available for use as starting materials include substituted ammonia compounds in which at least one, preferably only one of the hydrogen atoms of the ammonia molecule is substituted, and which is selected from the group consisting of the alkali metal amides, urea ($NH_2CONH_2$), biuret ($NH_2CONHCONH_2$), sulfamide ($NH_2SO_2NH_2$), formamide ($HCONH_2$), hydrazine ($NH_2NH_2$), ethylenediamine ($NH_2CH_2CH_2NH_2$), cyanoguanidine, $NH_2C(NH)(NHCN)$, and melamine, $C_3N_3(NH_2)_3$. The alkali metal amides include those of lithium, sodium, potassium, rubidium and cesium, e.g., $NaNH_2$, $LiNH_2$ and $KNH_2$. Preferred starting materials include the alkali metal amides, especially lithium and sodium, urea and biuret.

The catalysts which may be employed in practice of the invention are the fluorides or metals which form acid salts with hydrogen fluoride. The metals comprise the alkali metals including the ammonium radical, alkaline earth metals including magnesium, and other metals such as aluminum, silver, mercury, thallium, zirconium, tin, bismuth, cobalt, nickel, copper and lead. Typical metal fluorides are NaF, LiF, KF, $MgF_2$, $AlF_3$, AgF, $AgF_2$, $AgF_3$, $CaF_2$, $BaF_2$, $BeF_2$, $CoF_3$, NiF, $NiF_2$ and $PbF_4$, and the bifluorides and higher fluorides of each. The term "fluoride" as employed here and in the appended claims unless otherwise modified is intended to include the normal fluoride, such as NaF; the bifluoride, such as $NaHF_2$; and other fluorides such as $NaF.3HF$.

In the more advantageous practice, the catalysts as charged into the reaction zone are the normal fluorides and bifluorides of the alkali metals including the ammonium radical. Preferably the reaction promoters initially introduced into the reaction zone are the bifluorides of such metals, particularly the bifluorides of lithium, sodium and potassium. It has been found that in general the bifluorides, while effecting production of substantially the same nitrogen-fluorine products, initiate reactions at a faster rate than when the catalyst is initially charged to the reaction in the form of the normal fluoride. For example, when using NaF as promoter, about an hour may elapse before substantial product formation may take place, whereas when the promoter initially charged is $NaHF_2$, the same degree of product formation may be effected in 15 minutes.

Proportions of starting material to fluoride catalyst employed may vary widely. At the outset of an operation, the mixture of starting material and catalyst may contain catalyst in amount in the range of 10–600% by weight based on the starting material present, more usually 10–400%, and preferably at least 100% and substantially in the range of 100–400%. In the case of a liquid starting material, the amount of catalyst may be large enough to form a damp, relatively solid mash.

Reactions are mildly exothermic. It has been found that reaction temperatures may lie substantially in the range of 0° to 300° C., preferably in the range of 0° to 200° C., in all cases, however, temperatures being maintained a few practicable degrees below the phase change temperature of the particular starting material employed, e.g., below the boiling point of the normally liquid hydrazine, and below the decomposition temperature of normally solid sulfamide. Particularly good results have been obtained in situations in which external reactor temperatures have been maintained substantially in the range of 0°–100° C. Preferred external reaction temperatures of 50°–100° C. promote high yields.

Rate of feed of elemental fluorine to a large extent is dependent upon variables such as size of operation and type of contacting of gas and solid in the reactor, and whether the material in the reactor is a mixture of dry granular solids or pasty mass or slush formed from liquid starting material and solid catalyst. In a reactor in which the content is packed to avoid substantial channeling, incoming gas is fed to the reactor preferably at a rate such that substantially all fluorine is consumed, optimum rate being readily determinable by trial run. Usually incoming fluorine is diluted with an inert gas such as nitrogen. While volume proportions of fluorine to nitrogen may be about 5:1, preferably about 1:1 proportions are employed.

Principal products, except when cyanoguanidine is employed as the starting material, are $NF_3$, (trans) $N_2F_2$, and $N_2F_4$. The usually dominant sought-for product is $NF_3$. Proportions of products may vary as indicated in the appended Examples, and may vary in constitution depending upon the starting material employed. For example lithium amide may produce $NF_3$ and $N_2F_2$ and substantially no $N_2F_4$, while sodium amide may produce $NF_3$ and $N_2F_4$ and substantially no $N_2F_2$. These products are readily recoverable from the reactor exit gases by conventional low temperature condensation and fractional distillation. Reactor residues are generally mixtures of various fluorides. $NF_3$ is of known utility, for example as an intermediate for reaction with a metal to make tetrafluorohydrazine, $N_2F_4$, a commercially available material. $N_2F_2$ is useful as a catalyst for the polymerization of monomers such as methyl methacrylate styrene and cyclopentadiene.

The principles of the invention as described above may be used to advantage to fluorinate cyanoguanidine,

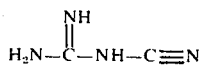

and thereby effect high yield production of perfluoromethylamine ($CF_3NF_2$), m.p. minus 122° C., a known compound which is a gas at normal conditions. In this embodiment, reaction temperatures may lie substantially in the range of 0°–200° C., preferably 0°–150° C. Otherwise all of the above operational techniques and procedural factors such as compositions of catalysts, proportioning of the cyanoguanidine and catalyst, rate of feed of fluorine and dilution of the same, and recovery of $CF_3NF_2$, likewise apply in practice of this modification of the invention.

The following illustrate practice of the invention.

EXAMPLE 1

About 1 g. of lithium amide, $LiNH_2$, was mixed with lithium fluoride, LiF, both reagent grade powders, in about a 3:2 weight ratio. The mixture was placed in a 1 inch I.D. nickel Swartz type U-tube, wall thickness about ⅛ inch, which was immersed in a dry ice-acetone cold bath. For purification purposes, gaseous fluorine was passed through a hydrogen fluoride scrubber containing sodium fluoride at a flow rate of approximately 20 to 30 cc/min. The fluorine gas was then diluted with nitrogen at about a 1:1 volume ratio, and passed thru the lithium fluoride-lithium amide mixture. Effluent gases of the tube were passed directly into and thru an infrared cell which was equipped with $BaF_2$ windows and had been placed in an infrared spectrophotometer. The tube was held at about minus 78° C. for about 2 hours during which time, aside from fluorine and nitrogen, the only compound exiting the reactor was carbon tetrafluoride believed to be an impurity in the incoming fluorine. The reactor was removed from the cold bath and permitted to warm up. When the reactor reached about 0° C., infrared analysis of the material in the cell showed that the reactor off-gas contained about 2 mmHg of $NF_3$. In about 15 min. the reactor warmed up to about room temperature, and difluorodiazine, $N_2F_2$, was formed and discharged into the cell. Using the same fluorine-nitrogen mixture and flow rate as above, fluorine was passed through the tube for about a half hour at approximately room temperature and a few degrees higher. At that time, by infrared analysis, it was determined that the reactor off-gas contained approximately 24 mmHg of nitrogen trifluoride and about 8 mmHg of difluorodiazine. Fluorine flow was then terminated and the reactor was flushed with nitrogen for 1 hour. The tube was cooled to about 0° C., and charging of the 1:1 nitrogen-fluorine mixture was resumed. Nitrogen trifluoride was observed immediately, and after about 30 minutes, difluorodiazine was again formed and discharged from the reactor. Temperature of the reactor was held at about 0° C. After about 60 min., fluorine flow was stopped, and the tube was flushed with nitrogen and allowed to warm to room temperature. Fluorine flow rate was increased to approximately 40 to 50 cc/min. while the 1:1 nitrogen dilution was maintained. Reaction was continued for about another 60 minutes during which the intensity of the infrared spectrum of difluorodiazine slowly increased to 15 mmHg, while that of the nitrogen trifluoride increased rapidly to >60 mmHg.

EXAMPLE 2

About 1 g. of reagent grade urea was mixed with sodium fluoride, NaF, in weight ratio of about 1:1, and the resulting mixture was charged into the U-tube of Example 1. Incoming fluorine gas was scrubbed as in Example 1. Fluorine flow was adjusted to approximately 20 to 30 cc/min, and after about 1:1 dilution with nitrogen, the mixture was fed into the tube. Temperature was held about 25° C. As shown by infrared analysis of the reactor exit gas, $NF_3$ was formed in about 60 min. Reaction was continued for another hour during which infrared analysis showed the reactor off-gas to contain about 130 mmHg of nitrogen trifluoride and about 100 mmHg of tetrafluorohydrazine, $N_2F_4$. The residue in the tube at the end of the run was a white solid containing red and yellow discolorations.

EXAMPLE 3

About 2 g. of 95% anhydrous hydrazine, $NH_2NH_2$ m.p. 1.4° C., were mixed with NaF in weight ratio of about 1:1, and a thick slush was obtained. The U-tube was passivated with fluorine and nitrogen, and the $NH_2NH_2$-NaF mixture was charged in the tube. Scrubbed fluorine gas flow rate was approximately 20 to 30 cc/min., and nitrogen dilution was about 1:1. The tube and contents were initially at room temperature. After about an hour, about 3 mmHg of nitrogen trifluoride and a trace of difluorodiazine were formed. The tube and contents warmed up to about 50° C., and the intensity of the infrared spectrums began to decrease. The tube was immersed in a 0° C. bath. About 15–30 min. later, intensities of the infrared spectrum of nitrogen trifluoride and difluorodiazine greatly increased. From the infrared spectrum it was determined that approximately 18 mmHg of difluorodiazine and about 15 mmHg of $NF_3$ were present in the reactor exit.

EXAMPLE 4

About 1 g. of sulfamide, $NH_2SO_2NH_2$, was mixed with NaF in weight ratio of about 1:1, and the resulting mixture was placed in the nickel U-tube. Scrubbed fluorine gas flow rate was adjusted to approximately 40 cc/min. and nitrogen dilution was about 1:1. The tube and contents were cooled to 0° C. About a half hour after fluorine feed was commenced, nitrogen trifluoride was formed as shown by infrared spectrum analysis of reactor off-gas. About 5 minutes later, sulfuryl fluoride, $SO_2F_2$ b.p. minus 52° C., and tetrafluorohydrazine, $N_2F_4$ appeared. From the infrared spectrum it was determined that the reactor off-gas contained about 4mmHg of $N_2F_4$, and about 30 mmHg of $NF_3$. When the tube was allowed to warm up to 25° C., as determined by infrared spectrum the composition of the reactor off-gas did not change appreciably.

EXAMPLE 5

Approximately 0.6 g. of lithium amide, $LiNH_2$, was placed in the nickel U-tube and flushed with nitrogen for over 1 hour. The tube was immersed in a minus 78° C. bath, and fluorine gas at a flow rate of 20 cc/min, diluted 1:1 with nitrogen was passed thru the tube. The effluent gases were passed through an infrared cell inserted in an infrared spectrophotometer as in the above Examples. After 1 hour, only $SiF_4$ and $CF_4$ (an impurity in the fluorine gas) were observed. The fluorine flow was terminated, the tube flushed with nitrogen, and permitted to warm to room temperature. Passage of gaseous fluorine over the lithium amide was resumed. During about 1½ hours of fluorine gas feed, only $SiF_4$ and $CF_4$ were observed in the effluent gas stream.

EXAMPLE 6

About 1 g. of biuret, $NH_2CONHCONH_2$, were ground with LiF in weight ratio of about 1:1. The resulting mixture was charged into a monel cylinder about 6 inches high and 2 inches I.D., wall thickness about ¼ inch, provided with a gas inlet, about 2 inches from the top, consisting of a dip-tube extending down to within an inch from the bottom. The gas outlet about 2 inches from the top of the cylinder communicated with an infrared cell inserted in an infrared spectrophotometer as in the above Examples. The scrubbed fluorine gas flow rate was adjusted to about 15 cc/min. and nitrogen dilution was about 1:1. Throughout this run, reaction temperature was held at about 25° C. In about 30 minutes $NF_3$ appeared in the reactor effluent gas. Infrared analysis of off-gases showed the same to contain about 30 mmHg of nitrogen trifluoride and about 8 mmHg of tetrafluorohydrazine along with smaller amounts of carbon dioxide, carbonyl fluoride, and carbon tetrafluoride. In a similar supplemental run, about 0.1–0.2 g. of biuret was ground with LiF in weight ratio of about 1:1, and the resulting mixture was introduced into the monel reactor. The latter was immersed in a minus 4° C. bath, and fluorine gas, diluted 1:1 with nitrogen was passed over the mixture at rate of about 10 to 15 cc/min. Infrared analysis of the reactor off-gas, after 20–30 minutes showed formation of nitrogen trifluoride and tetrafluorohydrazine, and small amounts of carbon dioxide and carbonyl fluoride. However, the yields of nitrogen trifluoride and tetrafluorohydrazine were less than those previously obtained at 25° C. The cold bath was removed, and when the temperature rose to about 10° C., the yield of nitrogen trifluoride and tetrafluorohydrazine increased rapidly. Heat was applied to the reactor, and when skin temperature of the reactor reached approximately 75°–100° C., yields of about 45 mmHg of nitrogen trifluoride and about 20 mmHg tetrafluorohydrazine were obtained as determined from infrared spectrum analysis.

EXAMPLE 7

About 1 g. each of lithium amide and sodium bifluoride, $NaHF_2$, were mixed and charged into the reactor of Example 6. Scrubbed fluorine gas flow rate was adjusted to about 20 cc/min, and after nitrogen dilution of about 1:1, the fluorine-nitrogen mixture was charged into the reactor. Throughout the run reactor temperature was maintained at about 25° C. As determined by infrared analysis of the reactor exit gas, immediately on introduction of fluorine into the reactor, nitrogen trifluoride formed, and within about 30 minutes a yield of about 5 mmHg of $NF_3$ was obtained as determined by infrared analysis of the reactor off-gas. After reaction time of about 2 hours, reactor off gas contained about 53 mmHg of $NF_3$ and 20 mmHg of $N_2F_2$. The gaseous impurities included small amounts of $NO$, $NO_3F$ and $NO_2$.

EXAMPLE 8

About 1 g. each of biuret and $NaHF_2$ were mixed and charged into the reactor of Example 6. Scrubbed fluorine gas flow rate was adjusted to about 20 cc/min., and after nitrogen dilution of about 1:1, the fluorine-nitrogen mixture was charged into the reactor. Throughout the run, reactor temperature was maintained at about 25° C. Within half an hour after charging of fluorine, $NF_3$ and $N_2F_2$ were formed, as was determined by infrared analysis of the reactor off-gas, and thereafter, for a period of about 60 min. yields of $NF_3$ and $N_2F_2$ increased rapidly. Then $N_2F_4$ was observed and masked the infrared bands of $N_2F_2$. At about 105 min. after start up infrared bands of $N_2F_4$ became so strong that the absorbance became infinite. Infrared analysis of about a 50% nitrogen dilution of the product gas showed presence of about 20 mmHg of $NF_3$ and 40 mmHg of $N_2F_4$. In a supplemental run, substantially the same as foregoing, after about an hour operation at about 25° C., external temperature of the reactor was raised to about 75°–100° C. as in Example 6, and shortly thereafter infrared analysis of the off-gas of the reactor showed the presence therein of about 360 mmHg of $NF_3$ and about 200 mmHg of $N_2F_4$.

EXAMPLE 9

About 1 g. each of urea and $NaHF_2$ were mixed in weight ratio of about 1:1, and the resulting mixture was introduced into the reactor of the previous Example. Scrubbed fluorine gas flow rate was adjusted to about 20 cc/min, and after nitrogen dilution of about 1:1, the fluorine-nitrogen mixture was charged into the reactor. Throughout the run reactor temperature was maintained at about 25° C. Infrared analysis of the reactor off-gas indicated that immediately on introduction of fluorine into the reactor some $NF_3$ was formed. Further, infrared analysis of the reactor off-gas showed that within the subsequent 30 minute larger yields of $NF_3$ were obtained, and in about 1 hour the reactor off-gas contained about 4 mmHg of $N_2F_4$ and 40 mmHg of $NF_3$, and in 2 hours more than about 75 mmHg of $NF_3$ and more than about 25 mmHg of $N_2F_4$, along with small amounts of impurities such as $COF_2$, $CO$, $N_2O$ and $NO_3F$.

EXAMPLE 10

About 1 g. each of cyanoguanidine and sodium bifluoride were mixed and charged into the monel reactor of Example 6. Scrubbed fluorine gas flow rate was adjusted to about 20 cc/min, and after nitrogen dilution of about 1:1, the fluorine-nitrogen mixture was charged into the reactor. Throughout the run, external temperature of the reactor was maintained at about 25°C., and internal reaction temperature was several degrees higher. As determined by infrared analysis, the reactor exit gas contained $CF_3NF_2$ in amount of about 50 mmHg.

EXAMPLE 11

About 5 g. each of cyanoguanidine and sodium bifluoride were mixed and charged into the monel reactor of Example 6. Scrubbed fluorine gas flow rate was adjusted to about 20–30 cc/min, and after nitrogen dilution of about 1:1, the fluorine-nitrogen mixture was charged into the reactor. Throughout the run, external temperature of the reactor was maintained at about 25°C., and internal reaction temperature was several degrees higher. For about the first half hour of the run the reactor off-gas contained some $CF_4$. As determined by infrared analysis, the reactor exit gas, for about the next 3 hours, contained a large yield of $CF_3NF_2$ in amount in excess of 100 mmHg. After initial half hour forerun in which some $CF_4$ was present, the only fluorine-nitrogen compound present in the reactor exit gas was perfluoromethylamine.

In the foregoing examples, the notation "mmHg" indicates partial pressures of each of the constituent gases observed in the infrared cell.

I claim:

1. The process for cleaving substituted ammonia compounds containing nitrogen-hydrogen bonds selected from the group consisting of alkali metal amides, urea, biuret, sulfamide, formamide, hydrazine, ethylenediamine, cyanoguanidine and melamine and fluorinating the resulting cleavage products, which comprises in combination the steps of:
   a. introducing into a reaction zone one or more of the aforementioned substituted ammonia compounds as starting material and a fluoride catalyst, said fluoride catalyst being a fluoride of a metal which forms an acid salt with hydrogen fluoride,
   b. subjecting said starting material to the action of elemental fluorine while in the presence of said catalyst,
   c. maintaining temperatures in the reaction zone substantially in the range of 0°–300°C. but not above the phase change temperature of the starting material if a liquid, or not above the decomposition temperature of the starting material if a solid, and
   d. collecting from the reaction zone the volatile off-gases containing fluorinated cleavage products.

2. The process of claim 1 in which
   a. the starting material is cyanoguanidine,
   b. reaction temperatures are maintained substantially in the range of 0°–200°C. and
   c. in which there are collected from the reaction zone the volatile off-gases containing pentafluoromethylamine.

3. The process of claim 2 in which the fluoride catalyst introduced into the reaction zone is an alkali metal fluoride.

4. The process of claim 2 in which the metal fluoride catalyst introduced into the reaction zone is a bifluoride of an alkali metal of the group consisting of lithium and sodium.

5. The process for cleaving substituted ammonia compounds containing nitrogen-hydrogen bonds selected from the group consisting of alkali metal amides, urea, biuret, sulfamide, formamide, hydrazine, ethylenediamine and melamine and fluorinating the resulting cleavage products, which comprises in combination the steps of:
   a. introducing into a reaction zone one or more of the afore-mentioned substituted ammonia compounds as starting material and a fluoride catalyst, said fluoride catalyst being a fluoride of a metal which forms an acid salt with hydrogen fluoride,
   b. subjecting said starting material to the action of elemental fluorine while in the presence of said catalyst,
   c. maintaining temperatures in the reaction zone substantially in the range of 0°–300°C. but not above the phase change temperature of the starting material if a liquid, or not above the decomposition temperature of the starting material if a solid, to effect cleavage of the starting material and fluorination of the cleavage products and
   d. collecting from the reaction zone the volatile off-gases containing nitrogen trifluoride.

6. The process of claim 5 in which the metal fluoride catalyst introduced into the reaction zone is an alkali metal fluoride.

7. The process of claim 5 in which the metal fluoride catalyst introduced into the reaction zone is a bifluoride.

8. The process of claim 5 in which the metal fluoride catalyst introduced into the reaction zone is a fluoride of an alkali metal of the group consisting of lithium and sodium.

9. The process of claim 5 in which
   a. the metal fluoride catalyst is a bifluoride of an alkali metal of the group consisting of lithium and sodium,
   b. the temperatures in the reaction zone are maintained substantially in the range of 0°–200°C. and
   c. in which the fluorine as charged is diluted with no more than an equal volume of inert gas.

10. The process of claim 5 in which the starting material is lithium amide.

11. The process of claim 5 in which the starting material is urea.

12. The process of claim 5 in which the starting material is biuret.

13. The process of claim 5 in which the starting material is sulfamide.

14. The process of claim 5 in which the starting material is hydrazine.

* * * * *